(12) United States Patent
Guo et al.

(10) Patent No.: US 8,609,773 B2
(45) Date of Patent: Dec. 17, 2013

(54) OLEFIN/ACRYLIC POLYMER BLENDS

(75) Inventors: Hailan Guo, Warrington, PA (US); Jian-Yang Cho, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 308 days.

(21) Appl. No.: 13/179,604

(22) Filed: Jul. 11, 2011

(65) Prior Publication Data

US 2012/0022218 A1   Jan. 26, 2012

Related U.S. Application Data

(60) Provisional application No. 61/365,926, filed on Jul. 20, 2010.

(51) Int. Cl.
| | | |
|---|---|---|
| C08F 8/00 | (2006.01) |
| C08L 23/04 | (2006.01) |
| C08L 33/02 | (2006.01) |
| C08L 33/04 | (2006.01) |
| C08L 35/02 | (2006.01) |
| C08L 39/04 | (2006.01) |

(52) U.S. Cl.
USPC ........... 525/192; 525/203; 525/207; 525/217; 525/221; 525/222; 525/240

(58) Field of Classification Search
USPC .......... 525/192, 203, 207, 217, 221, 222, 240
See application file for complete search history.

(56) References Cited

U.S. PATENT DOCUMENTS

| | | | | |
|---|---|---|---|---|
| 4,292,390 A * | 9/1981 | Katoh et al. | .................. | 430/207 |
| 4,293,636 A | 10/1981 | Okuya | | |
| 5,262,485 A * | 11/1993 | Yamamoto | .................... | 525/210 |
| 5,290,866 A | 3/1994 | Dobreski | | |
| 5,529,834 A | 6/1996 | Tsai et al. | | |
| 6,528,174 B1 | 3/2003 | Vogel et al. | | |
| 6,919,406 B2 | 7/2005 | Petroski et al. | | |
| 8,236,896 B2 * | 8/2012 | Hatae et al. | .................... | 525/191 |
| 2002/0007014 A1 * | 1/2002 | Hyde et al. | .................... | 525/191 |
| 2006/0094824 A1 | 5/2006 | Roulin | | |
| 2006/0189735 A1 | 8/2006 | Jin | | |
| 2007/0049682 A1 | 3/2007 | Walsh | | |
| 2010/0058656 A1 | 3/2010 | Chevalier | | |

FOREIGN PATENT DOCUMENTS

| | | |
|---|---|---|
| DE | 2044497 | 3/1972 |
| EP | 2206743 A1 | 7/2010 |
| JP | 57174326 | 10/1982 |
| JP | 2000239460 | 9/2000 |
| JP | 2001164054 | 6/2001 |
| JP | 2004284605 | 10/2004 |
| WO | 9404610 | 3/1994 |
| WO | 0302352 | 1/2003 |

* cited by examiner

*Primary Examiner* — Nathan M Nutter
(74) *Attorney, Agent, or Firm* — Carl P. Hemenway

(57) ABSTRACT

In one aspect of the present invention, there is provided a polymeric film comprising one or more polyolefins and one or more acrylic polymers, wherein the weight ratio of said acrylic polymers to said polyolefins is from 0.02:1 to 5:1, wherein each said polyolefin comprises polymerized units of one or more functional monomers, wherein the amount of said polyolefins in said polymeric film is more than 30% by weight, based on the weight of said polymeric film, and wherein said acrylic polymers comprise polymerized units of one or more hydrogen-bondable monomers.

8 Claims, No Drawings

OLEFIN/ACRYLIC POLYMER BLENDS

BACKGROUND

Polymeric films are useful for a wide variety of purposes. For example, polymeric films may be used as graphic arts films. Some graphic arts films need to have properties such as, for example, one or more of the following properties: ability to be produced as a film with a smooth appearance; resistance to stress whitening; desirably high elongation at break in a tensile test; desirably high tensile modulus, desirably high tensile strength, and printability.

US 2006/0189735 describes resins containing high-impact polyolefin resin, polyolefin-based thermoplastic elastomer, acrylate functional polymer, mineral filler, and lubricant. It is desired to provide polymeric films that have one or more of the properties useful for graphic arts films and that do not require polyolefin-based thermoplastic elastomers.

STATEMENT OF THE INVENTION

In one aspect of the present invention, there is provided a polymeric film comprising one or more polyolefins and one or more acrylic polymers, wherein the weight ratio of said acrylic polymers to said polyolefins is from 0.02:1 to 5:1, wherein each said polyolefin comprises polymerized units of one or more functional monomers, wherein the amount of said polyolefins in said polymeric film is more than 30% by weight, based on the weight of said polymeric film, and wherein said acrylic polymers comprise polymerized units of one or more hydrogen-bondable monomers.

DETAILED DESCRIPTION

As used herein, when a ratio of two numbers is said to be "X:1 or higher," it is meant that the ratio has the value Y:1, where Y is equal to or greater than X. Similarly, when a ratio of two numbers is said to be "W:1 or lower," it is meant that the ratio has the value Z:1, where Z is equal to or lower than W.

As used herein, a "film" is an object that has one dimension (thickness) that is relatively small compared to the other two dimensions (length and width). The thickness of a film is 0.01 mm to 2 mm. The length and width of a film are each 1 cm or larger. The surface of a film defined by its length and width is known herein as the film's "face."

A "polymer," as used herein and as defined by F W Billmeyer, JR. in Textbook of Polymer Science, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Generally, polymers have weight-average molecular weight (Mw) of 1,000 or more. Polymers may have extremely high Mw; some polymers have Mw above 1,000,000; typical polymers have Mw of 1,000,000 or less. Some polymers are crosslinked, and crosslinked polymers are considered to have infinite Mw. Some polymers are characterized by Mn, the number-average molecular weight.

As used herein "weight of polymer" means the dry weight of polymer.

Molecules that can react with each other to form the repeat units of a polymer are known herein as "monomers."

One method of characterizing polymers is the glass transition temperature (Tg) as measured by Differential Scanning Calorimetry. As used herein, a "hard" polymer is a polymer having Tg of 30° C. or above. If a polymer has more than one Tg, that polymer is considered "hard" if the lowest Tg is 30° C. or above. As used herein, a "soft" polymer is a polymer having Tg of 20° C. or below. If a polymer has more than one Tg, that polymer is considered "soft" if the highest Tg is 20° C. or below.

As used herein, a negligible amount of an ingredient in a polymer is 0.02% or less by weight, based on the total weight of that polymer.

The present invention involves at least one acrylic polymer. As used herein, an acrylic polymer is a polymer that contains, as polymerized unit, 50% or more by weight, based on the weight of the acrylic polymer, acrylic monomer. Acrylic monomers are (meth)acrylic acid, substituted or unsubstituted esters of (meth)acrylic acid, and substituted or unsubstituted amides of (meth)acrylic acid. As used herein "(meth)acrylic" means acrylic or methacrylic; "(meth)acrylate" means acrylate or methacrylate; "(meth)acrylamide" means acrylamide or methacrylamide.

A multi-functional monomer is a monomer that has two functional groups that are capable of participating in a polymerization reaction. It is considered that multifunctional monomers give rise to polymer chain branching and/or crosslinking.

A group of monomers suitable to form polymerized units of the acrylic polymer is the group of unsubstituted alkyl methacrylates. Preferred alkyl methacrylates have alkyl group of 1 to 18 carbon atoms; more preferred is 8 or fewer carbon atoms, more preferred is 6 or fewer carbon atoms, more preferred is 4 or fewer carbon atoms. In preferred embodiments, methyl methacrylate, butyl methacrylate, or a mixture thereof is used. More preferred are embodiments in which both methyl methacrylate and butyl methacrylate are used.

Another group of monomers suitable to form polymerized units of the acrylic polymer is the group of unsubstituted alkyl acrylates. In preferred embodiments, one or more unsubstituted alkyl acrylates is used that has alkyl group of 1 to 18 carbon atoms. In preferred embodiments, one or more unsubstituted alkyl acrylates are used that have alkyl groups of 2 or more carbon atoms. In preferred embodiments, one or more unsubstituted alkyl acrylates are used that have alkyl groups of 8 or fewer carbon atoms, more preferred is 6 or fewer carbon atoms; more preferred is 2 to 4 carbon atoms. Most preferred unsubstituted alkyl acrylates are ethyl acrylate, butyl acrylate, and mixtures thereof.

In some embodiments, one or more acrylic polymers of the present invention contain, as polymerized units, one or more monomers that are not acrylic monomers. Some suitable non-acrylic monomers include, for example, vinyl compounds that are not acrylic monomers. Some suitable such vinyl compounds include, for example, vinyl acetate and vinyl aromatic compounds. Preferred acrylic polymers have no monomer other than acrylic monomers. In preferred compositions of the present invention, every polymer has monomer units, all of which are acrylic monomers.

A group of monomers suitable to form polymerized units of the acrylic polymer is the group of hydrogen-bondable monomers. As used herein, a hydrogen bondable monomer is a monomer that is capable of forming polymerized units of an acrylic polymer and that contains a hydrogen-bondable group. A hydrogen-bondable group contains an electronegative atom covalently bound to the monomer and covalently bound to a hydrogen atom. The electronegative atom must be fluorine, oxygen, or nitrogen. Suitable hydrogen-bondable monomers may or may not be acrylic monomers. Preferred hydrogen-bondable monomers are acrylic monomers having one or more carboxyl groups, amine-substituted alkyl (meth) acrylates, hydroxy-substituted alkyl (meth)acrylates, acrylic monomers derived from phthalic acid, and mixtures thereof. Some other examples of suitable hydrogen-bondable monomers are nitrogen-containing vinyl compounds such as, for example vinyl imidazole, n-vinyl pyrrolidone, and substituted versions thereof.

Preferred hydrogen-bondable monomers that may be used to form polymerized units of the acrylic polymer are (meth) acrylic acid, itaconic acid, monomers derived from phthalic acid, amine-substituted (meth)acrylates, and mixtures thereof. More preferred are monomers derived from phthalic acid, amine-substituted (meth)acrylates, (meth)acrylic acid, and mixtures thereof. Most preferred hydrogen-bondable monomer is acrylic acid.

Some polymerizations of the acrylic polymer are performed in the presence of a chain transfer agent. Chain transfer agents are compounds that limit the length of a polymer chain that is growing by free-radical polymerization. Mercaptans such as dodecylmercaptan (n-DDM) and aldehydes such as 1-hexanal are examples of useful chain transfer agents. Chain transfer agents, since they add to the polymer chain, are also useful in introducing functionality into the polymer chain. Mercaptopropionic acid is an example of a chain transfer agent that can add carboxylic acid functionality into the polymer.

Preferred acrylic polymers are multi-stage polymers. A multi-stage polymer is a polymer made by a process in which a first polymerization is conducted to completion or near completion, followed by one or more subsequent polymerizations, each of which is conducted in the presence of the previous stage or stages, and each of which is conducted to completion or near completion. The polymer formed by the first polymerization is known as the first-stage polymer; the polymer formed by the second polymerization is known as the second stage polymer, etc. If no polymerization is conducted after completion of the first stage, the resulting polymer is known herein as a single-stage polymer. A multi-stage polymer that is made in exactly two stages is known herein as a "two-stage" polymer.

Preferred multi-stage polymers have at least one soft stage polymer. Preferred soft stage polymers have Tg of 10° C. or below. Independently, preferred soft stages have Tg of −60° C. or above; more preferred −30° C. or above.

Preferred soft stage polymers have polymerized units of one or more unsubstituted alkyl acrylate monomers in which the alkyl group has 2 to 18 carbon atoms. More preferred are alkyl acrylate monomer in which the alkyl group has 2 to 8 carbon atoms; more preferred are ethyl acrylate, butyl acrylate, and 2-ethylhexyl acrylate. The preferred amount of such monomers is, by weight based on the weight of the soft stage polymer, 25% or more; more preferred is 50% or more; more preferred is 60% or more. Independently, the preferred amount of such monomers is 95% or less; more preferred is 80% or less.

Preferred soft stage polymers have polymerized units of one or more unsubstituted alkyl methacrylate monomers in which the alkyl groups have 1 to 4 carbon atoms. Preferred are methyl methacrylate and butyl methacrylate; more preferred is methyl methacrylate. The preferred amount of such monomers is, by weight based on the weight of the soft stage polymer, 2% or more; more preferred is 5% or more; more preferred is 10% or more; more preferred is 20% or more. Independently, the preferred amount of such monomers is 75% or less; more preferred is 50% or less; more preferred is 30% or less.

Preferred soft stage polymers have polymerized units of one or more hydrogen-bondable monomers. The preferred amount of such monomers is, by weight based on the weight of the soft stage polymer, 1% or more; more preferred is 2% or more; more preferred is 4% or more; more preferred is 5% or more. Independently, the preferred amount of such monomers is 30% or less; more preferred is 20% or less; more preferred is 10% or less.

Preferred soft stage polymers are either made in the absence of chain transfer agent or are made in the presence of a negligible amount of chain transfer agent. More preferred soft stage polymers are made in the absence of chain transfer agent.

Preferred soft stage polymers either have no polymerized units of multi-functional monomer or have a negligible amount of polymerized units of multi-functional monomer. More preferably a soft stage polymer is used that has no polymerized units of multi-functional monomer.

Preferred multi-stage polymers have one or more hard stage polymers. Preferred hard stage polymers have Tg of 40° C. or higher; more preferably 50° C. or higher.

The monomers preferred for use in a hard stage polymer are the same as those described herein above as preferred for use in soft stage polymers.

Preferred hard stage polymers have polymerized units of one or more unsubstituted alkyl acrylates. When an unsubstituted alkyl acrylate is used in hard stage polymer, the preferred amount is 2% or more; more preferred is 5% or more; more preferred is 10% or more. Independently, when an unsubstituted alkyl acrylate is used in hard stage polymer, the preferred amount is 75% or less; more preferred is 50% or less; more preferred is 25% or less.

Preferred hard stage polymers have polymerized units of one or more unsubstituted alkyl methacrylates. When an unsubstituted alkyl methacrylate is used in hard stage polymer, the preferred amount is 10% or more; more preferred is 20% or more; more preferred is 40% or more; more preferred is 50% or more. Independently, when an unsubstituted alkyl methacrylate is used in hard stage polymer, the preferred amount is 95% or less; more preferred is 85% or less.

Preferred hard stage polymers have polymerized units of one or more hydrogen-bondable monomers. The preferred amount of hydrogen-bondable monomer in a hard stage polymer is the same as the preferred amounts for a soft stage polymer, as described herein above.

Preferred hard stage polymers are made in the presence of one or more chain transfer agents. The preferred amount of chain transfer agent used in the polymerization of the hard stage polymer is, by weight based on the weight of the hard stage polymer, 0.12% or more; more preferably 0.25% or more; more preferably 0.4% or more. Independently, the preferred amount of chain transfer agent used in the polymerization of the hard stage polymer is, by weight based on the weight of the hard stage polymer, 5% or less; more preferably 2% or less; more preferably 1% or less.

Preferred hard stage polymers either have no polymerized units of multi-functional monomer or have a negligible amount of polymerized units of multi-functional monomer. More preferably a hard stage polymer is used that has no polymerized units of multi-functional monomer.

Preferred multi-stage polymers have weight ratio of hard stage polymer to soft stage polymer of 0.1:1 or higher; more preferably 0.3:1 or higher; more preferably 0.45:1 or higher; more preferably 0.6:1 or higher. Independently, preferred multi-stage polymers have weight ratio of hard stage polymer to soft stage polymer of 10:1 or lower; more preferably 5:1 or lower; more preferably 3:1 or lower.

Preferred multi-stage polymers have at least one hard stage polymer that is polymerized in the presence of at least one soft stage polymer. More preferred are two-stage polymers that have a hard stage polymer that is polymerized in the presence of a soft stage polymer.

Polyolefins, as defined herein, are polymers that contain 50% or more by weight, based on the weight of the polymer, of polymerized units of one or more mono-olefin monomers.

Mono-olefin monomers, as defined herein, are unsaturated aliphatic hydrocarbons containing exactly one double bond per molecule. Examples of mono-olefin monomers are ethylene, propylene, isobutene, but-1-ene, 4-methylpent-1-ene, hex-1-ene, oct-1-ene, other alkenes having 10 or fewer carbon atoms and having exactly one double bond, located between the first and second carbon atoms, and mixtures thereof. Preferred mono-olefin monomers are ethylene, propylene, and mixtures thereof. More preferred is ethylene.

Preferred polyolefins contain some polymerized units are not mono-olefin monomers. Any vinyl compound that is not a mono-olefin monomer and that is capable of copolymerizing with a mono-olefin monomer is suitable as polymerized units in the polyolefin of the present invention. Some suitable vinyl compounds that are not mono-olefin monomers and that are capable of copolymerizing with a mono-olefin monomer are dienes, including, for example, butadiene, isoprene, and mixtures thereof. When one or more dienes are present, it is preferred that the amount of diene monomer, by weight based on the weight of the polyolefin, is 5% or less; more preferably 1% or less. A preferred group of vinyl compounds that are not mono-olefin monomers and that are capable of copolymerizing with a mono-olefin monomer is the group of monomers, known herein as "functional monomers," which is the group consisting of vinyl acetate; maleic anhydride; acrylic monomers; other vinyl compounds that contain one or more atoms selected from oxygen, nitrogen, sulfur, and combinations thereof; and mixtures thereof. More preferred functional monomers are vinyl acetate, maleic anhydride, (meth)acrylic acid, substituted and unsubstituted esters of (meth)acrylic acid, and mixtures thereof. More preferred functional monomers are vinyl acetate, maleic anhydride, (meth)acrylic acid, unsubstituted alkyl esters of (meth)acrylic acid in which the alkyl group has 8 or fewer carbon atoms, and mixtures thereof. More preferred functional monomers are vinyl acetate, acrylic acid, unsubstituted alkyl esters of acrylic acid in which the alkyl group has 3 or fewer carbon atoms, and mixtures thereof.

Preferred polyolefins have polymerized units of mono-olefin monomers in the amount, by weight based on the weight of the polyolefin, of 55% or more, more preferred 65% or more. Independently, preferred polyolefins have polymerized units of mono-olefin monomers in the amount, by weight based on the weight of the polyolefin, 95% or less, more preferred 90% or less.

Preferred polyolefins have polymerized units of functional monomers in the amount, by weight based on the weight of the polyolefin, of 5% or more, more preferred 10% or more. Independently, preferred polyolefins have polymerized units of functional monomers in the amount, by weight based on the weight of the polyolefin, 45% or less, more preferred 35% or less.

Preferred polyolefins of the present invention are not block copolymers. Preferred are polyolefins that are statistical copolymers.

Preferred polyolefins have weight-average molecular weight of 1,000,000 or lower; more preferably 500,000 or lower; more preferably 200,000 or lower. Independently, preferred polyolefins have weight-average molecular weight of 10,000 or higher; more preferable 20,000 or higher; more preferably 50,000 or higher.

In the polymeric film of the present invention, the preferred weight ratio of acrylic polymer to polyolefin is 0.05:1 or higher; more preferably 0.1:1 or higher; more preferably 0.2:1 or higher; more preferably 0.3:1 or higher; more preferably 0.4:1 or higher. Independently, in the composition of the present invention the preferred weight ratio of acrylic polymer to polyolefin is 2:1 or lower; or 1:1 or lower; or 0.8:1 or lower; or 0.6:1 or lower.

In the polymeric film of the present invention, the preferred amount of polyolefin is, by weight based on the weight of the polymer film, 35% or more; more preferred is 40% or more; more preferred is 50% or more. Independently, in the polymeric film of the present invention, the preferred amount of polyolefin is, by weight based on the weight of the polymer film, 90% or less; more preferred is 80% or less; more preferred is 70% or less.

The film of the present invention is produced by any method. Acrylic polymer, polyolefin, and optional additional ingredients may be mixed as solids (such as pellets or powders or a mixture thereof) or as liquids (such as latices, solutions, or a mixture thereof) or as a mixture thereof. The acrylic polymer may be, regardless of its method of polymerization, isolated as a solid such as a powder or pellets. The acrylic polymer may then be mixed with polyolefin in pellet or powder form, alone with optional additional ingredients, and the mixture may be melted and mixed in the melt state, and the film may be produced by extrusion, blowing, casting, or other methods.

The thickness of the film of the present invention is 0.01 mm or larger; or 0.02 mm or larger; or 0.05 mm or larger. Independently, the thickness of the film of the present invention is 2 mm or smaller; or 1 mm or smaller; or 0.5 mm or smaller; or 0.2 mm or smaller. In some embodiments, the length and width of a film of the present invention are, independent of each other, 1 cm or larger; or 10 cm or larger; or 1 meter or larger.

The film of the present invention may contain ingredients in addition to polyolefin and acrylic polymer. Such additional ingredients include, for example, processing aids, UV stabilizers, antiblocking agents, plasticizers, lubricants, impact modifiers, other additional ingredients, and mixtures thereof.

Another example of a contemplated use for films of the present invention part or all of a graphic arts film. Graphic arts films are films on which a visual image is apparent. A visual image may be alphanumeric characters or pictures or abstract forms or other forms any combination thereof. In some embodiments, a visual image is attached to a face of the film of the present invention, for example by printing.

Among embodiments in which a film of the present invention is used as part or all of a graphic arts film, the film of the present invention may or may not be part of a multilayer structure. Independently, the visual image may or may not be protected, for example by spraying the visual image with a fixative or by contacting the face of a transparent film to the visual image.

In preferred embodiments in which a film of the present invention is used as part or all of a graphic arts film, the graphic arts film may be stretchable (i.e., capable of tensile elongation of 10% or more without coming apart).

In some embodiments in which a film of the present invention is used as part or all of a graphic arts film, one face of the film of the present invention is in contact with a layer of a pressure sensitive adhesive. In some of such embodiments, the graphic arts film is used by attaching the graphic arts film to a rigid substrate by putting the layer of pressure sensitive adhesive into contact with the substrate. In some of such embodiments, the rigid substrate is flat. In some of such embodiments, all or part of the rigid substrate is curved. When the substrate is curved, it is contemplated that the graphic arts film is sufficiently stretchable that it can be stretched to conform to the curvature of the rigid substrate. Suitable rigid substrates include, for example, coated or uncoated metal, coated or uncoated wood, rigid plastics, glass, painted or unpainted plaster or plasterboard, other rigid substrates, and combinations thereof. Some suitable rigid substrates are, for example, one or more exterior surfaces of a vehicle such as, for example, an automobile, bus, or truck. Other suitable substrates are, for example, a window, a floor, or a wall.

It is to be understood that for purposes of the present examples that each operation disclosed herein is performed at 25° C. unless otherwise specified.

It is to be understood that for purposes of the present specification and claims that each operation disclosed herein is performed at 25° C. unless otherwise specified.

EXAMPLES

Test films were prepared according ASTM D882. Tensile testing was done on an Instron tensile tester at a crosshead speed of 12.7 cm/min. The gauge length was 2.54 cm and samples were rectangular in shape with dimensions of 8.89 cm×1.27 cm. Tensile strength at break (force at break/initial cross section area), and percent elongation at break [100* (extension at break−gauge length)/gauge length] were measured. Young's modulus is the slope of the stress-strain curve during the initial, linear portion of the curve.

The following abbreviations are used herein:
n-DDM=n-Dodecyl mercaptan
HBM1=hydrogen bondable acrylic monomer derived from phthalic acid
HBM2=hydrogen bondable acrylic monomer containing nitrogen
PA1=Paraloid™ K147 processing aid, Dow Chemical Company, does not have hydrogen-bondable monomer
PA2=Paraloid™ K-120ND processing aid, Dow Chemical Company, does not have hydrogen-bondable monomer.
PO1=Elvax™ 4260 polyolefin, Ethylene/Vinyl Acetate/Acrylic Acid with weight ratios 71/28/1.
PO2=Amplify™ EA100 polyolefin, Dow Chemical Company, Ethylene/Ethyl Acrylate with weight ratio of 85/15.
AP1=Paraloid™ B-48 polymer, Dow Chemical Company.
PLA=polylactic acid, from NatureWorks™ LLC, polymer 2002D
PU1=Kristalgran™ PN 03-217 thermoplastic urethane from Huntsman.
Elong=Elongation at break (%)
Stress=Stress at break in MegaPascal (MPa) (psi)
Modulus=Young's modulus in MegaPascal (MPa) (psi)
Mw=weight-average molecular weight, in thousands ("k")

Example 1

Preparation of Acrylic Polymer via Solution Polymerization

The following mixtures were used to produce an acrylic polymer:

| Mixture | Component | Parts by Weight |
|---|---|---|
| A | Toluene | 12.64 |
| B | Butyl acrylate | 4.05 |
|   | Butyl methacrylate | 5.85 |
|   | Methyl methacrylate | 26.93 |
|   | HBM1 (96%) | 2.45 |
|   | HBM2 (96%) | 0.69 |
|   | Toluene | 1.94 |
| C | tert-Butyl-2-ethylperoxyhexanoate | 0.13 |
|   | Toluene | 4.24 |
| D | tert-Butyl-2-ethylperoxyhexanoate | 0.14 |
|   | Toluene | 4.76 |
| E | Toluene | 36.18 |

A reactor equipped with stirrer and condenser and blanked with nitrogen was charged with Mixture A. 25% of Mixture B was charged into the reactor and heated to 110° C. When the temperature reached 110° C., 25.4% of Mixture C was added to the reactor. To the stirred reactor contents were added the remaining Mixtures B and C, respectively, over 68 minutes with syringe pumps. Mixture D was then charged into the reactor over 60 minutes with a syringe pump. Once the addition was complete, the mixture was hold at 110° C. for 30 minutes before charging Mixture E into the reactor. The resulting mixture was stirred at 110° C. for additional 30 minutes before transferring into an aluminum pan to be dried at 150° C. using an oven equipped with exhaust ventilation system.

Example 2

Preparation of Acrylic Polymer via Solution Polymerization

The following mixtures were used to produce an acrylic polymer using the methods of Example 1.

| Mixture | Component | Parts by Weight |
|---|---|---|
| A | Toluene | 19.01 |
| B | Butyl acrylate | 4.04 |
|   | Butyl methacrylate | 5.85 |
|   | Methyl methacrylate | 26.91 |
|   | HBM1 (96%) | 2.45 |
|   | HBM2 (96%) | 0.68 |
|   | Toluene | 1.94 |
| C | tert-Butyl-2-ethylperoxyhexanoate | 0.13 |
|   | Toluene | 4.24 |
| D | tert-Butyl-2-ethylperoxyhexanoate | 0.14 |
|   | Toluene | 4.76 |
| E | Toluene | 29.85 |

Example 3

Preparation of Acrylic Polymer via Solution Polymerization

The following mixtures were used to produce an acrylic polymer using the methods of Example 1.

| Mixture | Component | Parts by Weight |
|---|---|---|
| A | Toluene | 43.7 |
| B | Butyl acrylate | 4.04 |
|   | Butyl methacrylate | 5.85 |
|   | Methyl methacrylate | 26.91 |
|   | HBM1 (96%) | 2.45 |
|   | HBM2 (96%) | 0.68 |
|   | Toluene | 1.94 |
| C | tert-Butyl-2-ethylperoxyhexanoate | 0.13 |
|   | Toluene | 4.24 |
| D | tert-Butyl-2-ethylperoxyhexanoate | 0.14 |
|   | Toluene | 4.76 |
| E | Toluene | 5.16 |

Example 4

Preparation of Acrylic Polymer via Solution Polymerization

The following mixtures were used to produce an acrylic polymer using the methods of Example 1:

| Mixture | Component | Parts by Weight |
|---|---|---|
| A | Toluene | 14.67 |
| B | Butyl acrylate | 4.04 |
|   | Butyl methacrylate | 5.84 |

-continued

| Mixture | Component | Parts by Weight |
|---|---|---|
|  | Methyl methacrylate | 26.85 |
|  | HBM1 (96%) | 2.45 |
|  | HBM2 (96%) | 0.68 |
|  | n-DDM | 0.20 |
|  | Toluene | 1.93 |
| C | tert-Butyl-2-ethylperoxyhexanoate | 0.13 |
|  | Toluene | 4.23 |
| D | tert-Butyl-2-ethylperoxyhexanoate | 0.14 |
|  | Toluene | 4.75 |
| E | Toluene | 34.09 |

Example 5

Preparation of Acrylic Polymer via Solution Polymerization

The following mixtures were used to produce an acrylic polymer using the methods of Example 1.

| Mixture | Component | Parts by Weight |
|---|---|---|
| A | Toluene | 14.68 |
| B | Butyl acrylate | 4.04 |
|  | Butyl methacrylate | 5.84 |
|  | Methyl methacrylate | 26.86 |
|  | Hydroxyethyl methacrylate (97%) | 2.42 |
|  | HBM2 (96%) | 0.68 |
|  | n-DDM | 0.20 |
|  | Toluene | 1.93 |
| C | tert-Butyl-2-ethylperoxyhexanoate | 0.13 |
|  | Toluene | 4.23 |
| D | tert-Butyl-2-ethylperoxyhexanoate | 0.14 |
|  | Toluene | 4.75 |
| E | Toluene | 34.10 |

Example 6

Preparation of Acrylic Polymer via Solution Polymerization

The following mixtures were used to produce an acrylic polymer using the methods of Example 1.

| Mixture | Component | Parts by Weight |
|---|---|---|
| A | Toluene | 14.68 |
| B | Butyl acrylate | 4.04 |
|  | Butyl methacrylate | 5.84 |
|  | Methyl methacrylate | 26.87 |
|  | Acrylic acid (99%) | 2.37 |
|  | HBM2 (96%) | 0.68 |
|  | n-DDM | 0.20 |
|  | Toluene | 1.93 |
| C | tert-Butyl-2-ethylperoxyhexanoate | 0.13 |
|  | Toluene | 4.23 |
| D | tert-Butyl-2-ethylperoxyhexanoate | 0.14 |
|  | Toluene | 4.75 |
| E | Toluene | 34.11 |

Example 7

Preparation of Acrylic Polymer via Solution Polymerization

The following mixtures were used to produce an acrylic polymer using the methods of Example 1.

| Mixture | Component | Parts by Weight |
|---|---|---|
| A | Toluene | 14.41 |
| B | Butyl acrylate | 3.96 |
|  | Butyl methacrylate | 5.73 |
|  | Methyl methacrylate | 26.37 |
|  | Dimethylaminoethyl methacrylate | 2.33 |
|  | HBM2 (96%) | 0.67 |
|  | n-DDM | 0.20 |
|  | Toluene | 1.90 |
| C | tert-Butyl-2-ethylperoxyhexanoate | 0.13 |
|  | Toluene | 4.15 |
| D | tert-Butyl-2-ethylperoxyhexanoate | 0.14 |
|  | Toluene | 4.66 |
| E | Toluene | 33.47 |
| F | Benzyl chloride | 1.88 |

Example 8

Preparation of a 2-stage Acrylic Polymer via Solution Polymerization

| Mixture | Component | Parts by Weight |
|---|---|---|
| A | Toluene | 10.07 |
| B | Ethyl acrylate | 11.50 |
|  | Methyl methacrylate | 4.67 |
|  | Acrylic acid | 1.14 |
|  | Toluene | 0.84 |
| C | tert-Butyl-2-ethylperoxyhexanoate | 0.02 |
|  | Toluene | 1.23 |
| D | tert-Butyl-2-ethylperoxyhexanoate | 0.08 |
|  | Toluene | 6.21 |
| E | Ethyl acrylate | 4.70 |
|  | Methyl methacrylate | 22.23 |
|  | Acrylic acid | 1.91 |
|  | n-DDM | 0.14 |
|  | Toluene | 1.40 |
| F | tert-Butyl-2-ethylperoxyhexanoate | 0.09 |
|  | Toluene | 3.07 |
| G | tert-Butyl-2-ethylperoxyhexanoate | 0.10 |
|  | Toluene | 3.45 |
| H | Toluene | 27.15 |

A reactor equipped with stirrer and condenser and blanked with nitrogen was charged with Mixture A. 25% of Mixture B was charged into the reactor and heated to 110° C. When the temperature reached 110° C., 25.4% of Mixture C was added to the reactor. To the stirred reactor contents were added the remaining Mixtures B and C, respectively, over 45 minutes with syringe pumps. Mixture D was then charged into the reactor over 45 minutes with a syringe pump and was hold at 110° C. for 20 minutes. Mixtures E and F were charged to the reactor over 90 minutes and the mixture was hold at 110° C. for 5 minutes. Mixture G was then charged into the reactor over 60 minutes with a syringe pump. Once the addition was complete, the mixture was hold at 110° C. for 30 minutes before charging Mixture H into the reactor. The resulting mixture was stirred at 110° C. for additional 30 minutes before transferring into an aluminum pan to be dried at 150° C. using an oven equipped with exhaust ventilation system.

Example 9

Preparation of a 2-stage Acrylic Polymer via Solution Polymerization

The following mixtures were used to prepare a 2-stage acrylic polymer using the methods of Example 8.

| Mixture | Component | Parts by Weight |
|---|---|---|
| A | Toluene | 10.07 |
| B | Butyl acrylate | 11.50 |
|   | Methyl methacrylate | 4.67 |
|   | Acrylic acid | 1.14 |
|   | Toluene | 0.84 |
| C | tert-Butyl-2-ethylperoxyhexanoate | 0.02 |
|   | Toluene | 1.23 |
| D | tert-Butyl-2-ethylperoxyhexanoate | 0.08 |
|   | Toluene | 6.21 |
| E | Butyl acrylate | 4.70 |
|   | Methyl methacrylate | 22.23 |
|   | Acrylic acid | 1.91 |
|   | n-DDM | 0.14 |
|   | Toluene | 1.40 |
| F | tert-Butyl-2-ethylperoxyhexanoate | 0.09 |
|   | Toluene | 3.07 |
| G | tert-Butyl-2-ethylperoxyhexanoate | 0.10 |
|   | Toluene | 3.45 |
| H | Toluene | 27.15 |

Example 10

Preparation of a 2-stage Polymer via Solution Polymerization

The following mixtures were used to prepare a 2-stage acrylic polymer using the methods of Example 8.

| Mixture | Component | Parts by Weight |
|---|---|---|
| A | Toluene | 10.06 |
| B | Butyl acrylate | 11.48 |
|   | Methyl methacrylate | 4.66 |
|   | Acrylic acid | 1.13 |
|   | n-DDM | 0.09 |
|   | Toluene | 0.84 |
| C | tert-Butyl-2-ethylperoxyhexanoate | 0.02 |
|   | Toluene | 1.23 |
| D | tert-Butyl-2-ethylperoxyhexanoate | 0.08 |
|   | Toluene | 6.21 |
| E | Butyl acrylate | 4.69 |
|   | Methyl methacrylate | 22.20 |
|   | Acrylic acid | 1.91 |
|   | n-DDM | 0.14 |
|   | Toluene | 1.40 |
| F | tert-Butyl-2-ethylperoxyhexanoate | 0.09 |
|   | Toluene | 3.06 |
| G | tert-Butyl-2-ethylperoxyhexanoate | 0.10 |
|   | Toluene | 3.44 |
| H | Toluene | 27.16 |

Examples 11-16

Test Results

The above acrylic polymers were dried at 150° C. using an oven equipped with exhaust ventilation outlet, the polymer was pelletized along with the polyolefin compositions and other polymeric compositions listed in the tables below using a 30 mm twin screw extruder and 4 mm 2-strand die (Leistritz, Somerville, N.J.). The pelletizing conditions were: temperature was 190° C., feed rate was 4.5-6.8 kg/hr (10-15 lbs/hour), and revolutions per minute (RPM) were 100. The pellets were then processed with a single layer blown film line, equipped with a 2.25 mm die (Killion, 24:1 D/L, New Jersey) to produce a single layer film, or extruded with a 30 mm twin screw extruder with a 8 inch flat film die (Leistritz, Somerville, N.J.).

TABLE 1

| | | | | Films | | | |
|---|---|---|---|---|---|---|---|
| Ex # | Acrylic Polymer | Acrylic Mw (k) | Elong (%) | Stress in MPa (psi) | Modulus in MPa (psi) | Film Bulk | Film Surface |
| 11 | Ex #1 | 290 | 633 | 9.49 (1376) | 40.0 (5,800) | opaque | smooth |
| 12 | Ex #2 | 150 | 229 | 14.27 (2070) | 231.7 (33,600) | translucent | smooth |
| 13 | Ex #3 | 90 | 113 | 16.5 (2400) | 285.5 (41,400) | clear | smooth |
| 14 | Ex #4 | 60 | 13 | 10.34 (1500) | 280.0 (40,600) | clear | smooth |
| 15C | PA1 | | 242 | 9.37 (1359) | 109.6 (15,890) | opaque | rough |
| 16C | PA2 | | 558 | 5.29 (767) | 146.9 (21,300) | opaque | rough |

Polyolefin was PO1.
Ratio of acrylic polymer to polyolefin was 40:60.
"Ex #" means Example Number.

TABLE 2

| | | | Films | | |
|---|---|---|---|---|---|
| Ex # | Acrylic polymer | HBG | Elong (%) | Stress in MPa (psi) | Modulus in MPa (psi) |
| 17 | Ex #4 | carboxylic acid | 13 | 10.34 (1500) | 280.0 (40,600) |
| 18 | Ex #5 | hydroxyl | 123 | 19.24 (2790) | 526.8 (76,400) |
| 19 | Ex #6 | carboxylic acid | 140 | 19.44 (2820) | 482.0 (69,900) |
| 20 | Ex #7 | ammonium | 459 | 6.95 (1008) | 41.44 (6,010) |

Polyolefin was PO1.
Weight ratio of acrylic to polyolefin was 40:60.
"HBG" is the hydrogen bondable group of the acrylic polymer.
All films had smooth surface.

TABLE 3

| | | | | Films | | | |
|---|---|---|---|---|---|---|---|
| Ex # | Acrylic (%) | Other #1 (%) | Other #2 (%) | smoothness | Stress whitening | Elong (%) | Modulus in MPa (psi) |
| 21 | AP1 (35%) | — | — | g | p | 166 | 186.9 (27,100) |
| 22 | AP1 (30%) | PLA (5%) | — | vg | g | 162 | 168.9 (24,500) |
| 23 | AP1 (30%) | PLA (10%) | — | vg | g | 180 | 211.7 (30,700) |
| 24 | AP1 (20%) | PLA (10%) | PU1 (5%) | ex | g | 283 | 264.8 (38,400) |

Each composition had 30% by weight PO2 based on the weight of the composition.
Amounts shown are weight % based on the weight of the composition.
Smoothness of the film was rated by eye, with ratings of very poor (vp), poor (p), good (g), very good (vg), and excellent (ex).
Stress whitening was assessed by stretching the film by hand and rating the result by eye, using the same rating scale.

TABLE 4

| | | | Films | | |
|---|---|---|---|---|---|
| Example # | Acrylic | | SW | Modulus in MPa (psi) | Elong (%) | Stress in MPa (psi) |
| 25 | Example 8 | MD | vg | 355.8 (51600) | 613 | 15.51 (2250) |
| | | TD | p | 103.8 (15060) | 320 | 5.344 (775) |
| 26 | Example 9 | MD | vg | 306.1 (44400) | 791 | 19.72 (2860) |
| | | TD | g | 54.47 (7900) | 541 | 6.385 (926) |
| 27 | Example 10 | MD | vg | 316.5 (45900) | 656 | 14.067 (2040) |
| | | TD | p | 92.60 (13430) | 53.3 | 3.027 (439) |
| 28 | AP1 | MD | g | 383.3 (55600) | 293 | 13.63 (1997) |
| | | TD | vp | 58.10 (8440) | 583 | 6.957 (1009) |

All films had PO1;
weight ratio of acrylic polymer to polyolefin was 35:65.
Films were extruded through a flat die.
"MD" is machine direction;
"TD" is transverse direction.
"SW" is stress whitening, rated as in Table 3.

We claim:

1. A polymeric film comprising one or more polyolefins and one or more acrylic polymers,
wherein the weight ratio of said acrylic polymers to said polyolefins is from 0.02:1 to 5:1,
wherein each said polyolefin comprises polymerized units of one or more functional monomers,
wherein the amount of said polyolefins in said polymeric film is more than 30% by weight, based on the weight of said polymeric film, and
wherein said acrylic polymers comprise polymerized units of one or more hydrogen-bondable monomers, and
wherein each said acrylic polymer is a multi-stage polymer comprising a hard polymer and a soft polymer.

2. The polymeric film of claim 1, wherein each said polyolefin comprises polymerized units of one or more functional monomers selected from the group consisting of vinyl acetate, maleic anhydride, acrylic monomers, and mixtures thereof.

3. The polymeric film of claim 1, wherein said functional monomers comprise vinyl acetate.

4. The polymeric film of claim 1, wherein the amount of said functional monomers is 5% to 35% by weight based on the weight of said polyolefin.

5. The polymeric film of claim 1, wherein said soft polymer is made in the presence of an amount of chain transfer agent that is either negligible or zero.

6. The polymeric film of claim 1, wherein said hard polymer is made in the presence of one or more chain transfer agent.

7. The polymeric film of claim 1, wherein the amount of said polyolefins in said polymeric film is 35% or more by weight, based on the weight of said polymeric film.

8. The polymeric film of claim 1, wherein the amount of polymerized units of hydrogen-bondable monomers in said soft stage polymer is 1% or more.

* * * * *